(12) United States Patent
Heel et al.

(10) Patent No.: US 12,654,850 B2
(45) Date of Patent: Jun. 16, 2026

(54) VTOL AIRCRAFT WITH A BATTERY ELECTRIC DRIVE AND AN INTERNAL COMBUSTION ENGINE

(71) Applicant: Head GmbH, Ottobrunn (DE)

(72) Inventors: Patrick Heel, Ottobrunn (DE); Thomas Pohn, Munich (DE)

(73) Assignee: HEAD GMBH, Ottobrunn (DE)

( * ) Notice: Subject to any disclaimer, the term of this patent is extended or adjusted under 35 U.S.C. 154(b) by 0 days.

(21) Appl. No.: 18/720,283

(22) PCT Filed: Dec. 6, 2022

(86) PCT No.: PCT/EP2022/084560
§ 371 (c)(1),
(2) Date: Jun. 14, 2024

(87) PCT Pub. No.: WO2023/110533
PCT Pub. Date: Jun. 22, 2023

(65) Prior Publication Data
US 2025/0042564 A1 Feb. 6, 2025

(30) Foreign Application Priority Data

Dec. 15, 2021 (DE) ..................... 10 2021 133 301.6

(51) Int. Cl.
*B64C 29/00* (2006.01)
*B64D 27/31* (2024.01)
(Continued)

(52) U.S. Cl.
CPC .......... *B64C 29/0033* (2013.01); *B64D 27/31* (2024.01); *B64D 27/33* (2024.01); *B64D 27/357* (2024.01); *B64D 31/18* (2024.01)

(58) Field of Classification Search
CPC ...... B64D 27/24; B64D 27/33; B64D 27/357; B64D 29/0033
See application file for complete search history.

(56) References Cited

U.S. PATENT DOCUMENTS

| | | | |
|---|---|---|---|
| 2,814,451 A | 11/1957 | Turner et al. | |
| 11,091,258 B2 | 8/2021 | Groninga et al. | |
| | (Continued) | | |

FOREIGN PATENT DOCUMENTS

| | | | |
|---|---|---|---|
| DE | 102015001704 A1 | 8/2016 | |
| EP | 3878752 A1 | 9/2021 | |
| | (Continued) | | |

OTHER PUBLICATIONS

English-language transation of International Preliminary Report on Patentability issued in International Application No. PCT/EP2022/084560 on Jun. 27, 2024.

*Primary Examiner* — Timothy D Collins
*Assistant Examiner* — Justin Michael Heston
(74) *Attorney, Agent, or Firm* — Hoffmann & Baron, LLP

(57) ABSTRACT

A manned aircraft having wings, an internal combustion engine which is connected via a shaft to a left thrust nacelle and to a right thrust nacelle, which are pivotable from a vertical thrust orientation for a hovering flight phase into a horizontal thrust orientation for the forward flight phase, and having a left thrust unit and a right thrust unit which are driven by electric motors, and having a control unit which carries out a flight control and which controls the thrust units to generate thrust assisting with the hovering flight phase and at least partially stops them for the forward flight phase.

21 Claims, 2 Drawing Sheets

(51) Int. Cl.
 *B64D 27/33* (2024.01)
 *B64D 27/357* (2024.01)
 *B64D 31/18* (2024.01)

(56) References Cited

U.S. PATENT DOCUMENTS

| | | | |
|---|---|---|---|
| 12,006,033 | B1 * | 6/2024 | Villa ...................... B64U 50/19 |
| 2012/0292456 | A1 | 11/2012 | Hollimon et al. |
| 2016/0236774 | A1 | 8/2016 | Niedzballa |
| 2017/0297679 | A1 | 10/2017 | Elliott et al. |
| 2019/0135425 | A1 | 5/2019 | Moore et al. |
| 2020/0391862 | A1 * | 12/2020 | Groninga ........... B64C 29/0025 |
| 2021/0053676 | A1 | 2/2021 | Brand et al. |
| 2021/0253233 | A1 | 8/2021 | Foskey et al. |
| 2021/0253234 | A1 * | 8/2021 | Tao ......................... B64C 27/26 |
| 2021/0309351 | A1 * | 10/2021 | Giannini ................ B64D 27/33 |
| 2021/0331793 | A1 | 10/2021 | Groninga et al. |
| 2021/0403168 | A1 * | 12/2021 | Parsons ................... B60L 50/60 |
| 2022/0009626 | A1 * | 1/2022 | Baharav ................. B64C 27/26 |
| 2022/0258645 | A1 * | 8/2022 | Bower ................... B60L 58/12 |
| 2023/0150659 | A1 * | 5/2023 | Ivans .................... B64U 50/19 |
| | | | 244/12.4 |

FOREIGN PATENT DOCUMENTS

| | | | |
|---|---|---|---|
| EP | 3892537 | A1 | 10/2021 |
| WO | WO 2019/090191 | A1 | 5/2019 |
| WO | 2019212744 | A1 | 11/2019 |
| WO | 2020105045 | A1 | 5/2020 |
| WO | 2020245366 | A1 | 12/2020 |
| WO | WO 2021/234657 | A1 | 11/2021 |

* cited by examiner

VTOL AIRCRAFT WITH A BATTERY ELECTRIC DRIVE AND AN INTERNAL COMBUSTION ENGINE

CROSS-REFERENCE TO RELATED APPLICATIONS

The present application is the U.S. National Phase of PCT/EP2022/084560, filed on 6 Dec. 2022, which claims priority to German Patent Application No. 10 2021 133 301.6, filed on 15 Dec. 2021, the entire contents of which are incorporated herein by reference.

FIELD

The invention relates to an aircraft, in particular for manned operation.

SUMMARY

The object of the invention is to provide an aircraft which enables operation that is as safe and efficient as possible.

The invention results from the features of the independent claims. Advantageous further developments and embodiments are the subject matter of the dependent claims.

A first aspect of the invention relates to an aircraft, having a left wing and a right wing, each for generating aerodynamic lift during a forward flight phase of the aircraft, having an internal combustion engine arranged in the fuselage of the aircraft, which is connected via a respective shaft to a left thrust nacelle arranged on the left wing and to a right thrust nacelle arranged on the right wing, wherein the left thrust nacelle and the right thrust nacelle each have at least one rotor or propeller for generating thrust via the power transmitted by the shaft and are pivotable from a vertical thrust orientation for a hovering flight phase of the aircraft into a horizontal thrust orientation for the forward flight phase, and having a left thrust unit arranged on the left wing and a right thrust unit arranged on the right wing, each having at least one rotor or propeller and driven by electric motors that are electrically connected to a battery system, and having a control unit that is designed to carry out a moment-dynamic flight control, wherein control variables of the flight control in the forward flight phase include a flap control of aerodynamic surfaces of the wings and of a vertical stabilizer and horizontal stabilizer, wherein the control unit is designed to control the thrust nacelles for pivoting into the vertical thrust orientation for the hovering flight phase and to control the thrust units for generating thrust assisting with the hovering flight phase, and to at least partially stop the thrust units for the forward flight phase.

The aircraft in question is a so-called VTOL aircraft, wherein the abbreviation VTOL stands for "vertical take-off and landing". This means that take-off and landing of the aircraft are achieved by a hovering flight phase that is at least temporarily and approximately carried out (the aircraft does not necessarily have to hover in a fixed position, but regularly has at least a small rate of climb or descent—in terms of flight dynamics, however, this is essentially to be assigned to hovering), while cruise flight takes place through a forward flight phase in which the thrust nacelles, unlike in the hovering flight phase, are not primarily used to compensate for gravity, but to generate thrust primarily to overcome aerodynamic drag.

The flap control of aerodynamic control surfaces of the wing parts relates in particular to flaps on the wing parts whose setting angle is variable for applying a rolling moment in the forward flight of the aircraft. A flap on the vertical stabilizer that is rotatably mounted around a vertical axis (=yaw axis) of the aircraft is used to generate a yaw moment, while flaps on the horizontal stabilizer that are rotatable around a transverse axis of the aircraft can generate a pitching moment in forward flight. The vertical stabilizer and horizontal stabilizer can also be combined in a common tail assembly, for example, in a V-shaped tail assembly, which can also have flaps having a similar function to those described above (at least two flaps are jointly responsible for setting a pitching moment and a yaw moment).

In one embodiment, in particular, in hovering flight, the control variables of the moment-dynamic flight control include a blade angle adjustment of the rotors or propellers of the left thrust nacelle and the right thrust nacelle, in particular, at a constant speed of the propellers and/or rotors of the thrust nacelles. Alternatively or additionally to the blade angle adjustment on the thrust nacelles, a speed change can be used as a control variable of the rotors or propellers of the left thrust nacelle and the right thrust nacelle.

In an alternative embodiment, in particular, in hovering flight, the control variables of the moment-dynamic flight control include a speed change and/or a blade angle adjustment of the propellers or rotors of the thrust units, while preferably the blade setting angle and/or the speed of the propellers or rotors of the thrust nacelles remains constant in hovering flight. For example, if the front propellers or rotors of the thrust nacelles are operated at a different speed or a different blade angle of attack than the rear propellers or rotors of the thrust nacelles, a pitching moment around a transverse axis of the aircraft can be generated.

Preferably, all thrust-generating elements of the aircraft are part of the thrust units, optionally the thrust nacelles. In other words, preferably all propellers or rotors of the aircraft are arranged on the left wing or on the right wing directly or indirectly (i.e., on additional mounts arranged on the respective wing, wherein the fuselage is not to be understood in the sense of a mount), i.e., not arranged on a tail unit of the aircraft. In other words, the aircraft does not have any propellers or rotors on a tail unit of the aircraft.

Preferably, the left thrust nacelle is arranged at the wingtip of the left wing and the right thrust nacelle is arranged at the wingtip of the right wing. Accordingly, the left thrust unit is preferably arranged between the left thrust nacelle and the fuselage and the right thrust unit is arranged between the right thrust nacelle and the fuselage. The external arrangement of the left thrust nacelle and the right thrust nacelle advantageously simplifies the design, since the thrust nacelles are pivotable outside the wingtips (i.e., pivotable with respect to the wings). Furthermore, by utilizing the maximum achievable lever arm in relation to the fuselage of the thrust vector of the respective thrust nacelle, a larger moment in the rolling movement is made possible.

The left thrust nacelle and the right thrust nacelle are preferably pivotable independently of one another from a vertical thrust orientation for a hovering flight phase of the aircraft to a horizontal thrust orientation for the forward flight phase and vice versa. However, in an alternative embodiment, they can also be coupled to one another in such a way that they can only be pivoted simultaneously with one another, i.e., they are pivotable in a synchronized manner from a vertical thrust orientation for a hovering flight phase of the aircraft to a horizontal thrust orientation for the forward flight phase and vice versa. The same embodiments preferably also extend to the thrust units, so that in the case of partial pivotability they can be pivoted independently of one another or dependently on one another, depending on the embodiment. If the thrust nacelles are additionally pivotable to the rear slightly beyond the vertical, it is also possible for the aircraft to fly backwards.

In particular, the thrust units are arranged symmetrically to the fuselage with respect to a body-fixed longitudinal axis of the aircraft: furthermore, the propellers or rotors of a respective thrust unit are preferably arranged symmetrically with respect to a transverse axis extending through a center of gravity of the aircraft. Furthermore, the rotors or propellers of the thrust units are preferably arranged in pairs symmetrically to an imaginary connecting line of the thrust nacelles.

The terms "horizontal" and "vertical" in relation to the position of a thrust nacelle (thrust orientations) are to be based on the thrust vector of the respective thrust nacelle relative to the fuselage of the aircraft. If the fuselage is in a nominal starting orientation, wherein the nominal starting orientation is defined in such a way that a roll angle and a pitch angle of a fixed coordinate system are equal to zero in relation to a local fixed coordinate system, for example, if the aircraft is on the ground on a flat plane, the terms "horizontal" and "vertical" are consistent with the horizontal or vertical orientation in relation to the Earth. This assumption is approximately always fulfilled for a hovering flight phase of the aircraft, since otherwise, if the thrust vector is inclined away from a vertical position, the thrust vector would have a component that is not only directed against the gravity vector to compensate for it, but would induce a horizontal acceleration A vertically aligned thrust nacelle therefore compensates for the gravity vector without causing horizontal accelerations and thus position changes (except for output signals of a moment-dynamic flight control to compensate for external disturbances such as gusts or corrections of a horizontal position to assume a predefined landing position). The thrust vector of a thrust nacelle is therefore always horizontal when it points in the longitudinal direction of the aircraft, which is defined in a body-fixed manner, wherein the longitudinal direction of the aircraft is defined from a rear (in particular, having a horizontal stabilizer and a vertical stabilizer) of the aircraft to a front of the aircraft (in particular having the pilot's cabin); at right angles to this, the transverse axis of the aircraft is also defined in a body-fixed manner between the wingtip of the left wing and the wingtip of the right wing, and again at right angles to the longitudinal axis and the transverse axis, a body-fixed vertical axis, around which the vertical stabilizer typically aerodynamically stabilizes.

However, the terms "horizontal" and "vertical" in the context of propellers and rotors refer to the propeller plane and the rotor plane respectively, so that a horizontally aligned propeller or rotor has a vertical thrust vector and a vertically aligned propeller or rotor has a horizontal thrust vector. For the sake of clarity and uniformity with nacelles and thrust units, the terms horizontal and vertical as they relate to propellers and rotors will also be referenced based on their thrust orientation The terms "propeller" and "rotor" differ in the mounting of the propeller blades or rotor blades on a hub of a driven shaft. While propeller blades can transmit bending moments to the hub, rotor blades are connected to a shaft using a hub in an essentially flexible or fully articulated manner, as is customary with helicopter rotors. With a flexible or articulated mount, a flapping movement of the rotor blades is therefore possible, which has to occur, for example, in the case of a rotor disk with lateral incident flow (the rotor blades lie essentially in a plane in which the velocity vector of the rotor also lies) in order to compensate for the asymmetrical flow of the leading rotor blade in relation to the trailing rotor blade. Such a flapping movement typically also requires a pivoting movement in the rotor plane for the rotor blades, since a flapping movement of the rotor blades would result in a change in angular momentum due to the reduced radius of the center of gravity towards the hub, unless a pivoting movement would compensate for this by changing the peripheral velocity.

The terms "rotor" and "propeller" nevertheless fulfill the same function and are to be regarded as functionally equivalent in the scope of the application. Preferably, even for embodiments of the thrust nacelles, a hybrid design between the above-mentioned extremes is used, which represents a mixed form of propeller and rotor typical for tilt-rotor aircraft. Such hybrid constructions are also to be understood as the expression "rotor or propeller".

Essentially, the pivoting of the thrust nacelles results in thrust vector control to influence the moment dynamics of the aircraft, in that the pivoting of a thrust nacelle also causes the pivoting of a thrust vector generated by the thrust nacelle around the axis of rotation of the pivoting. In addition, in a further embodiment, the circumferentially cyclically modulated changes in a blade angle of attack in the rotors of the thrust nacelles, known from a helicopter rotor, can be used to generate a moment acting on the aircraft. The swashplate known from helicopters is preferably used to tilt the rotor plane in relation to the hub.

The aircraft according to the invention is particularly suitable for manned operation, i.e., it is in particular, a manned aircraft. The term "manned aircraft" does not necessarily mean that it is staffed by persons (which represents the exception when it is on the ground), but that it is suitable for the transport of persons, i.e., it is designed and authorized accordingly. This distinguishes the aircraft according to the invention from unmanned aircraft, which are unsuitable for the transport of persons and therefore have fundamentally different design features.

The left wing and the right wing include, in particular, an airfoil profile for deflecting inflowing air that naturally occurs in a forward flight phase of the aircraft. Due to its shape, the airfoil profile creates pressure differences between the upper and lower sides in order to accelerate air mass downwards perpendicular to the direction of incident flow, which, according to the known conservation of momentum, results in an aerodynamic lift, the amount of which is fundamentally dependent on the velocity of the incoming air and on its aerodynamic angle of attack relative to the inflowing air.

The left and right wings therefore generally do not generate any aerodynamic lift in a hovering flight phase of the aircraft, since the corresponding incident flow of the air is essentially absent. In order to compensate for the weight of the aircraft, according to the invention, the essentially vertical thrust vector of the left and right thrust nacelles, as well as the respective thrust vector of the respective thrust unit, which is also essentially vertically aligned, are used in the hovering flight phase of the aircraft. The thrust units are activated by the control unit in the hovering flight phase in order to generate thrust together with the thrust vector of the thrust nacelles, which is in the same direction, to compensate for the weight force against the direction of the gravity vector.

The respective shaft is used to transmit torque from the internal combustion engine and is led from the output of the internal combustion engine through the left wing and through the right wing to the respective thrust nacelle. A common shaft can be used between the left thrust nacelle and the right thrust nacelle so that the movement of the thrust nacelles is always synchronized. However, a freewheel is preferably provided for autorotation. The shaft, or the respective part of the shaft, or the respective shaft, is made, for example, of fiber-reinforced plastic such as carbon fiber-reinforced or glass fiber-reinforced plastic or metal such as high-strength steel, titanium, aluminum, or an alloy of multiple metals The moment-dynamic flight control, having its internal loop (also called "basic controller"), is used to influence the moment dynamics of the aircraft to influence rotation rates around body-fixed defined coordinate system axes, which result in the current orientation angles (in terms of orientation in space, expressed for example by the well-known Euler angles) of the aircraft via time integration. The current and past course of the orientation angles of the aircraft result in the current flight status of the aircraft, in particular, a flight altitude, a flight speed, an aerodynamic angle of attack, a pitch angle, and a yaw angle.

In particular, those rotors and propellers of the thrust units are optimized for hovering (incident flow velocity of the surrounding air approximately equal to zero) which are not intended to swivel, but are only activated in the forward flight phase. If the rotors and propellers of the thrust units are pivoted in such a way that they provide thrust to absorb cruising speed for the forward flight phase, they are preferably provided with a blade angle adjustment in order to be able to compensate for the incident flow speed due to the cruising speed of the aircraft in relation to the hovering flight phase.

Such a blade angle adjustment is therefore provided in particular on the rotors or propellers (depending on which type is used) of the thrust nacelles, since the thrust nacelles provide thrust both in the hovering flight phase and in the forward flight phase of the aircraft.

Preferably, a respective rotor or propeller of the thrust units has exactly two rotor blades or propeller blades. The rotor blades and propeller blades of those rotors and propellers of the thrust units that are not used in the forward flight phase are then preferably aligned along a longitudinal axis of the aircraft that is approximately collinear with the aerodynamic velocity vector in the forward flight phase, so that the aerodynamic drag caused by the unused rotor blades or propeller blades of the thrust units in forward flight is minimized.

Preferably, the blade angle adjustment of the propellers or rotors of the thrust nacelles is used at high frequency (in the relative sense to the above-mentioned low-frequency change) in the hovering flight phase of the aircraft for the moment-dynamic flight control in addition to a low-frequency change over the forward speed of the aircraft between the hovering flight phase and the forward flight phase. If the aerodynamic angle of attack of the rotor blades or propeller blades of one thrust nacelle is increased in comparison to the other thrust nacelle, the thrust nacelle having the increased angle of attack of its rotor blades or propeller blades generates more thrust, thereby generating a moment around the longitudinal axis of the aircraft, which in turn causes an angular acceleration in a rolling motion of the aircraft and thus the pitch angle of the aircraft can be changed.

In contrast, the propellers or rotors of the thrust units are preferably controlled by changing the speed in order to apply the moment-dynamic flight control described above, or their speed is basically left constant, so that they are then in particular no longer an (essential) part of the moment-dynamic flight control.

In a preferred embodiment, complementary filtering is used, according to which high-frequency frequency components of the control variables of the moment-dynamic flight control are transmitted to the thrust nacelles in order to influence, in particular, a roll angle of the aircraft in its hovering flight phase in short time scales, and according to which low-frequency frequency components are fed to the thrust units in order to implement a low-frequency component, in particular, for trimming the aircraft in its hovering flight phase, using their changed speeds of rotors or propellers.

In particular, the control unit is furthermore designed to control the thrust units to generate thrust when there is a risk of a vortex ring stage in the transition between the hovering flight phase and the forward flight phase and in the reverse transition.

The internal combustion engine is preferably a gas turbine, operated using fossil or synthetic fuel such as kerosene, diesel, gasoline, or the like: the internal combustion engine can also be understood to mean other devices for generating energy from chemical processes, such as a fuel cell or an internal combustion engine using hydrogen as a reductor and atmospheric oxygen as an oxidizer.

It is an advantageous effect of the invention that the advantages of an electric drive and an internal combustion engine are combined, since the electric drive is only used for a relatively short time due to using the batteries with their low energy density in relation to fuels such as kerosene, diesel, gasoline, or the like, but the high torques of the electric motors are utilized to assist the power-intensive hovering flight phase of the aircraft with high thrust. In the forward flight phase, the wing parts are primarily used to generate aerodynamic lift, while the thrust nacelles pivoted forward (horizontally) are used to compensate for the aerodynamic drag and utilize the high continuous power and thus the long range of the internal combustion engine, while the thrust units are at least partially shut down. Furthermore, the configuration according to the invention has advantages in the transition between the hovering flight phase and the forward flight phase with respect to the well-known dangerous vortex ring stage, in particular, if the thrust units are already controlled to generate thrust in this transition. The vortex ring stage refers to a condition that is particularly dangerous for tilt-rotor aircraft, in which the induced speed of the tilt rotors (which correspond to the thrust nacelles in the aircraft according to the invention) reaches a similar level to the descent speed of the aircraft, so that a clear flow direction of the propellers or rotors on the tilt rotors (thrust nacelles) is absent and a chaotic flow having many vortices arises and the controllability of the aircraft is significantly reduced.

According to an advantageous embodiment, the respective thrust unit has exactly two rotors or propellers arranged one behind the other, wherein the respective front rotor or propeller is arranged in front of the respective wing and the respective rear rotor or propeller is arranged behind the respective wing.

For this purpose, pylons are advantageously arranged on each wing, the length of which exceeds the wing depth and which thus protrude beyond the wing leading edge and the wing trailing edge. The rotors or propellers are preferably arranged at the ends of the pylons so that a more undisturbed outflow of the rotors or propellers is achieved.

Alternatively, only single propellers or rotors are used per wing, wherein each propeller or rotor can also be a coaxially arranged pair of propellers or rotors.

According to a further advantageous embodiment, the front rotors or propellers of the thrust units are pivotable, in particular, independently of one another, from a vertical thrust orientation for the hovering flight phase to a horizontal thrust orientation for the forward flight phase in order to generate thrust in the hovering flight phase as well as in the forward flight phase, and wherein the rear rotors or propellers of the thrust units are fixed in a horizontal thrust orientation, wherein the control unit is designed to control the rear rotors or propellers of the thrust units to generate thrust for the hovering flight phase and to stop them for the forward flight phase. Deactivating the rear rotors or propellers of the thrust units advantageously saves electrical energy in the forward flight phase, for which the internal combustion engine is therefore primarily used to overcome the aerodynamic drag. This advantageously makes it possible to make the batteries carried smaller and increase the range of the aircraft.

According to a further advantageous embodiment, the rear rotors or propellers of the thrust units are pivotable, in particular, independently of one another, from a vertical thrust orientation for the hovering flight phase to a horizontal thrust orientation for the forward flight phase in order to generate thrust in the hovering flight phase as well as in the forward flight phase, and wherein the front rotors or propellers of the thrust units are fixed in a horizontal thrust orientation, wherein the control unit is designed to control the front rotors or propellers of the thrust units to generate thrust for the hovering flight phase and to stop them for the forward flight phase.

According to a further advantageous embodiment, all rotors or propellers of the respective thrust unit are fixed in a horizontal thrust orientation, wherein the control unit is designed to stop all rotors or propellers of the thrust units for the forward flight phase.

According to this embodiment, the rotors or propellers of the thrust units are not pivotable, but are always fixed in the plane of the longitudinal and transverse axes of the aircraft. The elimination of joints for pivoting advantageously saves additional weight and reduces the function of the thrust units to the hovering flight phase, which is particularly energy-intensive in comparison to slow to medium forward flight.

According to a further advantageous embodiment, the control variables of the flight control in the hovering flight phase include speed changes of the rotors or propellers of the left thrust unit and the right thrust unit at a constant blade angle and/or a blade angle adjustment of the rotors or propellers of the left thrust unit and the right thrust unit.

According to a further advantageous embodiment, the direction of rotation of a rotor or propeller of the left thrust nacelle in the vertical thrust orientation is in the same direction as the direction of rotation of a rotor or propeller of the left thrust unit, wherein the direction of rotation of the rotor or propeller of the right thrust nacelle in the vertical thrust orientation is in the same direction as the direction of rotation of a rotor or propeller of the right thrust unit.

The rotation in the same direction of the geometrically adjacent propellers or rotors causes the respective propeller blades or rotor blades to run against one another at the shortest distance between their respective tips instead of having a tendency to mesh with one another. This has aerodynamic advantages, since the turbulent air from one propeller or rotor results in additional incident flow velocity for the other propeller or rotor. In other words, the peripheral velocities of the respective air vortices of the propellers or rotors meet at their contact areas with opposite velocities. This means that lower speeds are advantageously necessary.

According to a further advantageous embodiment, the control unit is designed to supply electrical energy generated in the forward flight phase by the internal combustion engine and an electrical generator of the internal combustion engine to the battery system in order to charge the battery system using electrical energy.

According to a further advantageous embodiment, the control unit is designed, in an autorotation phase by reversing the direction of the torque on the left thrust nacelle and the right thrust nacelle and the torque guided via the shaft to an electrical generator of the internal combustion engine, to supply the electrical energy generated thereby to the battery system in order to charge the battery system using electrical energy.

The autorotation phase indicates the state in which the thrust nacelles are in the so-called windmill state (windmill-brake state) in a corresponding position and reduce the descent speed of the aircraft by way of a clearly definable flow direction through the thrust nacelles from bottom to top, similar to a parachute.

According to a further advantageous embodiment, each of the electric rotors of a respective thrust unit is individually connected to a respective battery unit of the battery system, wherein all battery units can supply electrical energy to their respective electric motor independently of one another.

This advantageously increases the safety of the entire aircraft if only one battery unit of the battery system fails. In such a case, the control unit preferably supplies electrical energy from the other battery units and/or the electrical energy generated by an electrical generator of the internal combustion engine to the electric motor having the failed battery unit.

According to a further advantageous embodiment, the control unit is designed, in the event of a detected failure or discharge of a battery unit of the battery system, to supply the respective electric motor connected to the failed battery unit with electrical energy generated by an electric generator of the internal combustion engine, at least for the hovering flight phase.

According to a further advantageous embodiment, the control unit is designed, in the event of a detected failure of the battery system or a detected malfunction of the battery system, to control the internal combustion engine in such a way that electrical energy is generated by the electrical generator connected to the internal combustion engine and is fed to the electric motors of the thrust units at least for the hovering flight phase.

According to a further advantageous embodiment, the control unit is designed, in the event of a failure of the internal combustion engine detected at least in the forward flight phase, after a gliding phase with the aid of the left wing and the right wing and a subsequent low-level maneuver with continuous increase in the aerodynamic angle of attack while simultaneously reducing a horizontal speed, to control the thrust units to generate thrust immediately before the aircraft touches down on the ground.

The low-level maneuver is preferably carried out over a runway for fixed-wing aircraft or a flat surface such as a meadow. This corresponds to the so-called "flare" maneuver, in which the aerodynamic angle of attack increases over time and the speed decreases due to the reduced forward thrust. This maneuver can therefore be performed at a constant height above the ground, at least as long as no stall occurs on the wings. It is important to prevent such a stall, so that the control unit is preferably designed to control the thrust units accordingly in a timely manner before the stall occurs so that the aerodynamic angle of attack can be kept within predefined limits, and immediately before touching down on the ground, ensures by additional thrust from the control units that the aircraft hits the ground at a safe vertical speed.

Preferably, the control unit is designed to detect an imminent stall, in particular with the aid of corresponding aerodynamic sensors such as angle of attack sensors, and to control the thrust units to generate thrust at a predefined limit before the stall occurs, so that the occurrence of the stall on the left wing and on the right wing is avoided.

The latter embodiment is particularly used when a failure or significant malfunction of the internal combustion engine is detected during the forward flight phase. Preferably, the control unit is designed to carry out the embodiment independently and essentially without the necessary intervention of a pilot. The control unit preferably has a logic circuit for this purpose, the design of which determines whether the features of the embodiment are carried out or not. The forward flight phase is therefore preferably defined within the scope of this embodiment over a predetermined speed range and/or a predetermined altitude range of the aircraft, so that it is ensured that a sufficient altitude is available to carry out these reactions to the detected failure or the detected malfunction of the internal combustion engine and/or a sufficiently high speed of the aircraft over ground is available in order to have sufficient time to react as explained above.

In particular, with the aid of angle of attack sensors, a respective current aerodynamic angle of attack of the aircraft and thus of the wings can be determined and compared with a specified limiting value. If the aerodynamic angle of attack falls below the specified limiting value, the thrust units are preferably activated fully automatically by the control unit to generate thrust and the aircraft can touch down on the ground at a low descent speed.

According to a further advantageous embodiment, the control unit is designed, in an autorotation phase by reversing the direction of the torque on the left thrust nacelle and the right thrust nacelle and the torque guided via the shaft to an electrical generator of the internal combustion engine, to supply the electrical energy generated thereby to the battery system in order to charge the battery system using electrical energy.

According to this embodiment, in addition to the gliding flight of the gliding phase of the aircraft, the descent speed is used to obtain usable energy from the potential energy of the aircraft and, in an autorotation mode, to obtain electrical energy from the movement externally induced by the thrust nacelles through which air flows from bottom to top in the so-called windmill stage and to supply it to the battery system and store it therein in order to make it usable shortly before the aircraft touches down on the ground and to make it available for the thrust units.

This latter embodiment is also used in particular when a failure or significant malfunction of the internal combustion engine is detected during the forward flight phase. Preferably, the control unit is designed to carry out the embodiment independently and essentially without a required intervention of a pilot. For this purpose, the control unit preferably has a logic circuit, the execution of which determines whether the features of the embodiment are carried out or not. The forward flight phase is therefore preferably defined within the scope of this embodiment over a predetermined speed range and/or a predetermined altitude range of the aircraft, so that it is ensured that a sufficient altitude is available to carry out these reactions to the detected failure or the detected malfunction of the internal combustion engine and/or a sufficiently high speed of the aircraft over ground is available in order to have sufficient time to react as explained above.

According to a further advantageous embodiment, the control unit is designed to immediately control the thrust units to provide sufficient power in the event of a failure or malfunction of the internal combustion engine being detected during the hovering flight phase in order to prevent a hard impact of the aircraft on the ground. In the context of this embodiment, the hovering flight phase is again preferably defined by a predetermined altitude and/or speed range, so that a gliding flight with a sailing phase, which cannot build up sufficiently due to the speed and/or altitude being too low, i.e., cannot generate sufficient aerodynamic lift of the left and right wings, is not mistakenly initiated by the control unit at altitudes that are too low or at forward speeds that are too low. If the aircraft falls below a predetermined altitude and/or a predetermined speed or a combination of both, the aircraft is particularly dependent on the maximum power of the thrust units, so that in such a range the control unit, immediately after the detected failure or malfunction of the internal combustion engine in the hovering flight phase, controls the thrust units sufficiently to assist in compensating for the weight of the aircraft. This applies to the vertical take-off as well as the vertical landing of the aircraft.

Further advantages, features, and details will be apparent from the following description, in which—possibly with reference to the drawings—at least one example embodiment is described in detail. Identical, similar, and/or functionally identical parts are provided with the same reference numerals.

The illustrations in the figures are schematic and not to scale.

DETAILED DESCRIPTION

Figure 1:
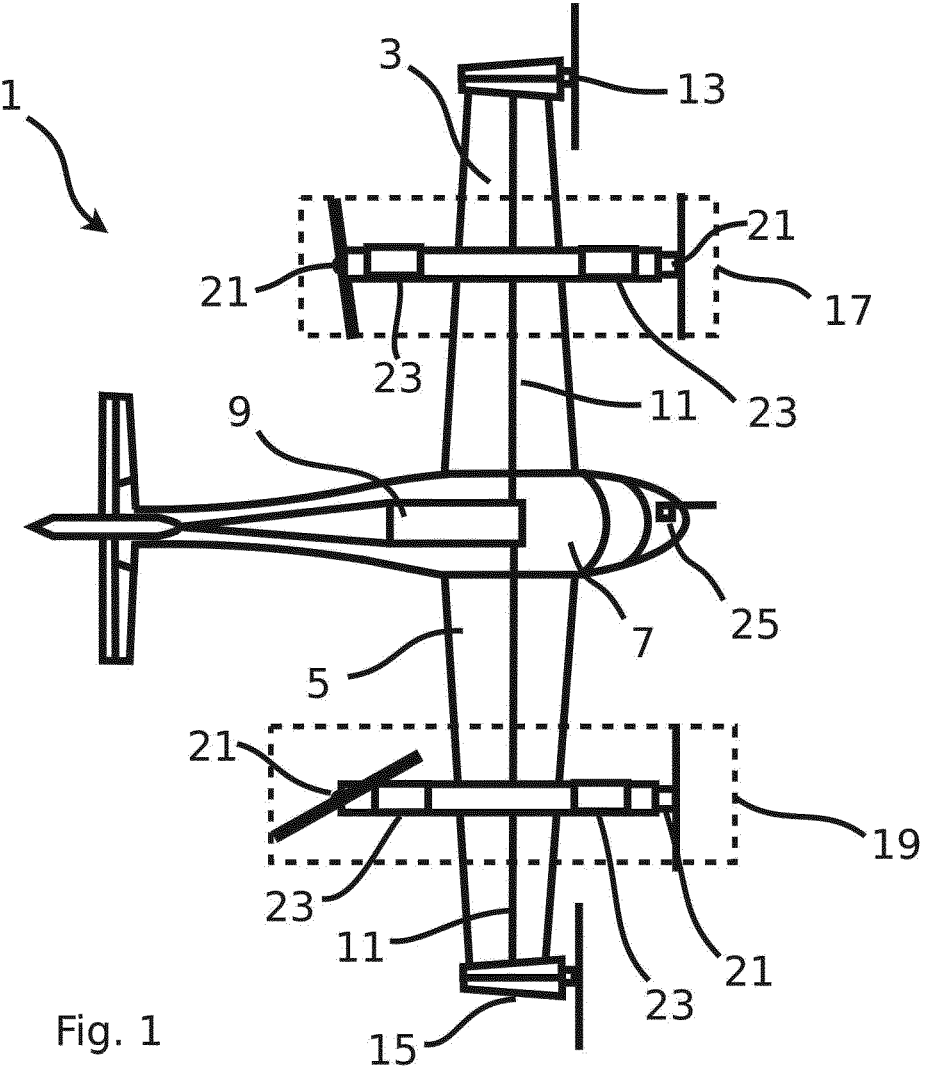
FIG. 1 shows an aircraft according to an example embodiment of the invention.

FIG. 1 shows an aircraft 1 for manned operation. It has four seats in a cabin in the fuselage 7. A left wing 3 and a right wing 5 are jointly used to generate aerodynamic lift during a forward flight phase. Furthermore, an internal combustion engine 9 is arranged in the fuselage 7 of the aircraft 1, which is connected via a respective shaft 11 made of carbon-fiber-reinforced plastic to a left thrust nacelle 13 arranged on the left wing 3 and to a right thrust nacelle 15 arranged on the right wing 5. The internal combustion engine 9 includes a shaft gas turbine for generating torque on the shaft 11. The left thrust nacelle 13 and the right thrust nacelle 15 each have a rotor for generating thrust using the power transmitted by the shaft 11. They are also pivotable independently of one another from a vertical thrust orientation for a hovering flight phase of the aircraft 1 to a horizontal thrust orientation for the forward flight phase. Between the thrust nacelles 13, 15 and the fuselage, a left thrust unit 17 and a right thrust unit 19 are arranged on the wings 3, 5, each having two propellers arranged one behind the other. The thrust units 17, 19 therefore have a total of four propellers made of carbon-fiber-reinforced plastic arranged symmetrically to the fuselage 7. The propellers of the thrust units 17, 19 are driven by electric motors 21, which in turn are electrically connected to a battery system 23.

Figure 2:
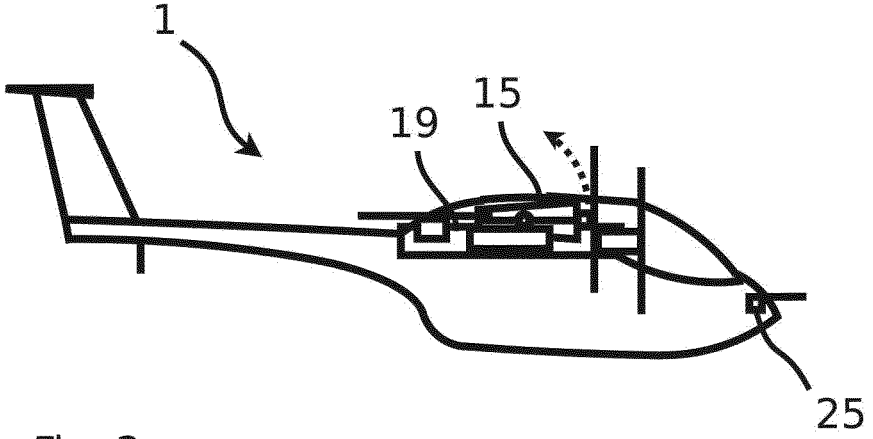
FIG. 2 shows the aircraft of FIG. 1 in a sideview.

The respective front propeller is arranged in front of the respective wing 3, 5 and is pivotable from the vertical thrust orientation for the hovering flight to a horizontal thrust orientation for forward flight. The respective rear propeller is arranged behind the respective wing 3, 5 and is fixed in a vertical thrust orientation. In FIGS. 1 and 2, the front propellers are shown in the horizontal thrust orientation. A control unit 25 carries out flight control with the aid of a PID basic controller. The PID basic controller relies, especially in the hovering flight phase, on the sensor signals of an inertial measuring unit, in particular, rotation angle rates with respect to a body-fixed coordinate system and orientation angles in relation to the earth. This involves orientation angle stabilization and rotation angle rate damping. Control variables for actuators of the aircraft 1 are generated as the output of the basic controller. The control variables include a blade angle adjustment of the rotors of the left thrust nacelle 13 and the right thrust nacelle 15 at an approximately constant speed in the hovering flight phase.

The rotational speed of the thrust nacelles 13, 15 is only adjusted depending on the flight condition and is essentially changed for the transition between the hovering flight phase and the forward flight phase with the IAS (English for "indicated airspeed"). However, during the hovering flight phase, the speed of the rotors of the thrust nacelles 13, 15 is maintained approximately constant. During this transition, the thrust gondolas 13, 15 are also pivoted from the vertical to a horizontal thrust orientation by the control unit 25. In the reverse transition from the forward flight phase to the hovering flight phase, the thrust gondolas 13, 15 are transferred from the horizontal thrust orientation back to a vertical thrust orientation by the control unit 25.

The control unit 25 also controls the electric motors 21 of the rear propellers in the hovering flight phase to generate thrust and brings them to a standstill in the forward flight phase. In this case, each of the electric motors 21 of a respective thrust unit 17, 19 is individually connected to a respective battery unit of a battery system 23, wherein all battery units can supply electrical energy to their respective electric motor 21 independently of one another. The front propellers are pivoted by the control unit 25 for the forward flight phase, from the vertical thrust orientation to the horizontal thrust orientation in order to obtain, together with the thrust nacelles 13, 15 pivoted to the horizontal thrust orientation, thrust to compensate for the aerodynamic drag.

However, when the cruising altitude is reached, the control unit 25 moves the front propellers to the vertical thrust orientation, stops them, and transfers them to an aerodynamically favorable position to minimize aerodynamic drag. The rear and front propellers of the thrust units 17, 19 are only activated in their vertical thrust orientation (with vertical thrust vector) to generate thrust during the transition from the forward flight phase to the hovering flight phase. Furthermore, the following emergency procedures are stored in the control unit 25:

If a failure or discharge of a battery unit of the battery system 23 is detected, the respective electric motor 21 connected to the failed battery unit is supplied with electrical energy generated by an electric generator of the internal combustion engine 9, at least for the hovering flight phase.

If a failure of the internal combustion engine 9 is detected in the forward flight phase within a range having a minimum altitude dependent on a forward speed, the thrust nacelles 13, 15 are controlled to pivot into an autorotation position, an automatic gliding flight with a gliding phase assisted by the wings 3, 5 is initiated together with a warning to the pilot, and the thrust units 17, 19 are controlled to generate thrust immediately before the aircraft 1 touches down on the ground, even before a stall occurs due to an extended flare maneuver initiated by the pilot or the control unit 25.

FIG. 2 shows the aircraft 1 in a sideview, which is shown in FIG. 1 drawn from above. In particular, the front propellers of the thrust units 17, 19 and the nacelles 13,15 are in horizontal thrust orientation producing thrust for the forward flight phase, with the rear propellers of the thrust units 17, 19 in the vertical thrust orientation, stopped, and placed in favorable aerodynamic position.

Figure 3:
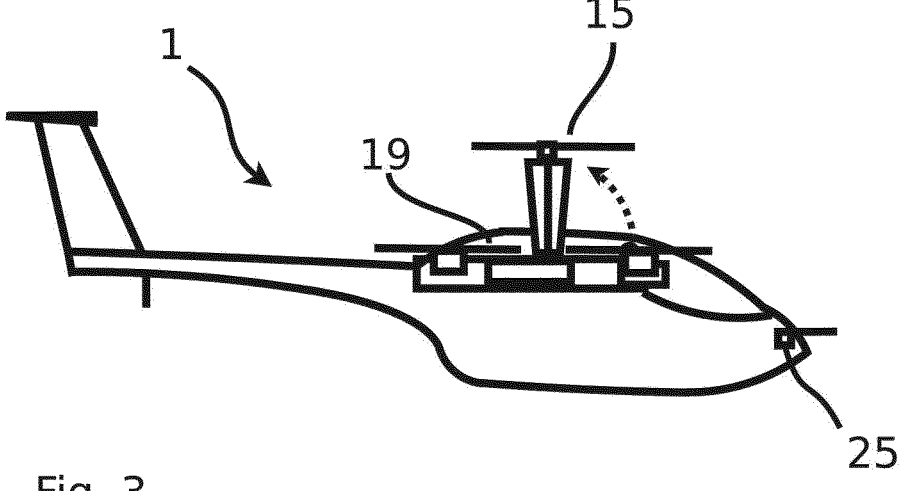
FIG. 3 shows an aircraft according to a further example embodiment of the invention in a sideview.

FIG. 3 shows an alternative embodiment of the aircraft 1, wherein, in contrast to that shown in FIGS. 1 and 2, all propellers of the respective thrust unit 17, 19 are fixed in a vertical thrust orientation. The control unit 25 then stops all propellers of the thrust units 17, 19 for the forward flight phase without pivoting them for the forward flight phase. In this case, the control variables of the flight control include speed changes of the propellers of the left thrust unit 17 and the right thrust unit 19 at a constant blade angle, as well as those mentioned above of the thrust nacelles 13, 15.

Although the invention has been further illustrated and described in detail by way of preferred example embodiments, the invention is not limited by the disclosed examples, and other variations can be derived therefrom by a person skilled in the art without departing from the scope of protection of the invention. It is therefore clear that a variety of possible variations exists. It is also clear that embodiments mentioned as examples are really only examples, which are not to be construed in any way as limiting the scope of protection, the possible applications, or the configuration of the invention. Rather, the preceding description and the description of the figures enable a person skilled in the art to implement the example embodiments, wherein a person skilled in the art may make various changes knowing the disclosed inventive concept, for example with regard to the function or arrangement of individual elements cited in an example embodiment, without departing from the scope of protection as defined by the claims and their legal equivalents, such as more extensive explanations in the description.

LIST OF REFERENCE NUMERALS

1 aircraft
3 left wing
5 right wing
7 fuselage
9 internal combustion engine
11 shaft
13 left thrust nacelle
15 right thrust nacelle
17 left thrust unit
19 right thrust unit
21 electric motors
23 battery system
25 control unit

The invention claimed is:

1. An aircraft comprising:
a single fuselage;

a left wing extending from the fuselage to a left wingtip and a right wing extending from the fuselage to a right wingtip, the left wing and the right wing jointly wings configured to generate aerodynamic lift during, a forward flight phase of the aircraft;

an internal combustion engine arranged in the fuselage, the internal combustion engine connected via a respective shaft to a left thrust nacelle arranged on the left wingtip of the left wing and to a right thrust nacelle arranged on the right wingtip of the right wing, wherein the left thrust nacelle and the right thrust nacelle each have at least one rotor or propeller to generate thrust via power transmitted by the respective shaft from the internal combustion engine, the left thrust nacelle being pivotable with respect to the left wing and the right thrust nacelle being pivotable with respect to the right wing from a vertical thrust orientation for a hovering flight phase of the aircraft to a horizontal thrust orientation for the forward flight phase;

a left thrust unit arranged on the left wing between the fuselage and the left thrust nacelle and a right thrust unit arranged on the right wing between the fuselage and the right thrust nacelle capable of assisting with the hovering flight phase of the aircraft, each of the left thrust unit and the right thrust unit having at least one rotor or propeller driven by electric motors that are electrically connected to a battery system; and a control unit configured to carry out a flight control, wherein control variables of the flight control in the forward flight phase comprise a flap control of aerodynamic surfaces of the left wing and the right wing, and of a vertical stabilizer and horizontal stabilizer, wherein the control unit is configured to control thrust nacelles to pivot with respect to the wings to the vertical thrust orientation for the hovering flight phase and to control the thrust units to generate thrust assisting with the hovering flight phase, and to at least partially stop the thrust units for the forward flight phase.

2. The aircraft of claim 1, wherein a respective thrust unit has exactly two rotors or propellers arranged one behind another, wherein a respective front rotor or propeller is arranged in front of the respective wing and a respective rear rotor or propeller is arranged behind the respective wing.

3. The aircraft of claim 2, wherein front rotors or propellers of the thrust units are pivotable independently of one another with respect to a respective wing from the vertical thrust orientation for the hovering flight phase to the horizontal thrust orientation for the forward flight phase in order to generate thrust in the hovering flight phase as well as in the forward flight phase, and wherein rear rotors or propellers of the thrust units are fixed in the vertical thrust orientation, wherein the control unit is configured to control the rear rotors or propellers of the thrust units to generate thrust for the hovering flight phase and to stop the thrust units for the forward flight phase.

4. The aircraft of claim 1, wherein all rotors or propellers of a respective thrust unit are fixed in a vertical thrust orientation, wherein the control unit is configured to stop all rotors or propellers of the thrust units for the forward flight phase.

5. The aircraft of claim 1, wherein the control variables of the flight control in the hovering flight phase comprise speed changes of the rotors or propellers of the left thrust unit and the tight thrust unit at a constant blade angle and/or a blade angle adjustment of the rotors or propellers of the left thrust unit and the right thrust unit.

6. The aircraft of claim 1, wherein the control unit is configured, in an autorotation phase by reversing a direction of torque on the left thrust nacelle and the right thrust nacelle and torque guided via the shaft to an electrical generator of the internal combustion engine, to supply electrical energy generated by the electrical generator to the battery system in order to charge the battery system using the electrical energy.

7. The aircraft of claim 1, wherein each of the electric motors of a respective thrust unit is individually connected to a respective battery unit of the battery system, wherein all battery units are capable of supplying electrical energy to their respective electric motor independently of one another.

8. The aircraft of claim 1, wherein the control unit is configured, in an event of a detected failure, malfunction, or discharge of the battery system, to supply a respective electric motor with electrical energy generated by an electrical generator of the internal combustion engine at least for the hovering flight phase.

9. The aircraft of claim 1, wherein the control unit is configured, in an event of a failure of the internal combustion engine detected at least in the forward flight phase, after a gliding phase with an aid of the left wing and the right wing and a subsequent low-level maneuver with continuous increase in the aerodynamic angle of attack while simultaneously reducing a horizontal speed, to control the thrust units to generate thrust immediately before the aircraft touches down on a ground.

10. The aircraft of claim 9, wherein the control unit is configured, during the gliding phase, to control the thrust nacelles to pivot into an autorotation position in order, by reversing a direction of torque on the left thrust nacelle and the right thrust nacelle and torque guided via the shaft to an electrical generator of the internal combustion engine, to supply electrical energy generated by the electrical generator to the battery system.

11. An aircraft comprising:

a single fuselage;

a left wing extending from the fuselage to a left wingtip and a right wing extending from the fuselage to a right wingtip, the left wing and the right wing jointly wings configured to generate aerodynamic lift during a forward flight phase of the aircraft;

an internal combustion engine arranged in the fuselage, the internal combustion engine connected via a respective shaft to a left thrust nacelle arranged on the left wingtip and to a right thrust nacelle arranged on the right wingtip, wherein the left thrust nacelle and the right thrust nacelle each have at least one rotor or propeller to generate thrust via power transmitted by the respective shaft from the internal combustion engine, the left thrust nacelle being pivotable with respect to the left wing and the right thrust nacelle pivotable with respect to the right wing from a vertical thrust orientation for a hovering flight phase of the aircraft to a horizontal thrust orientation for the forward flight phase; and a left thrust unit arranged on the left wing between the fuselage and the left thrust nacelle and a right thrust unit arranged on the right wing between the fuselage and the right thrust nacelle capable of assisting with the hovering flight phase of the aircraft, each of the left thrust unit and the right thrust unit having at least one rotor or propeller driven by electric motors that are electrically connected to a battery system.

12. The aircraft of claim 11, further comprising a control unit configured to carry out flight control, wherein control variables of the flight control in the forward flight phase comprise a flap control of aerodynamic surfaces of the left wing and the right wing, and of a vertical stabilizer and horizontal stabilizer, wherein the control unit is configured to control thrust nacelles to pivot with respect to the wings to the vertical thrust orientation for the hovering flight phase and to control the thrust units to generate thrust assisting with the hovering flight phase, and to at least partially stop the thrust units for the forward flight phase.

13. The aircraft of claim 11, wherein a respective thrust unit has exactly two rotors or propellers arranged one behind another, wherein a respective front rotor or propeller is arranged in front of a respective wing and a respective rear rotor or propeller is arranged behind the respective wing.

14. The aircraft of claim 13, wherein front rotors or propellers of the thrust units are pivotable independently of one another from the vertical thrust orientation for the hovering flight phase to the horizontal thrust orientation for the forward flight phase in order to generate thrust in the hovering flight phase as well as in the forward flight phase, and wherein rear rotors or propellers of the thrust units are fixed in the vertical thrust orientation in order to generate thrust for the hovering flight phase and are stopped for the forward flight phase.

15. The aircraft of claim 11, wherein all rotors or propellers of the thrust units are fixed in the vertical thrust orientation in order to generate thrust for the hovering flight phase and are stopped for the forward flight phase.

16. The aircraft of claim 11, wherein the control variables of the flight control in the hovering flight phase comprise speed changes of the rotors or propellers of the left thrust unit and the right thrust unit at a constant blade angle and/or a blade angle adjustment of the rotors or propellers of the left thrust unit and the right thrust unit.

17. The aircraft of claim 11, wherein each of the electric motors of a respective thrust unit is individually connected to a respective battery unit of the battery system, wherein all battery units are capable of supplying electrical energy to their respective electric motor independently of one another.

18. The aircraft of claim 12, wherein the control unit is configured, in an autorotation phase by reversing a direction of torque on the left thrust nacelle and the right thrust nacelle and torque guided via the shaft to an electrical generator of the internal combustion engine, to supply electrical energy generated by the electrical generator to the battery system in order to charge the battery system using the electrical energy.

19. The aircraft of claim 12, wherein the control unit is configured, in an event of a detected failure, malfunction, or discharge of the battery system, to supply a respective electric motor with electrical energy generated by an electrical generator of the internal combustion engine at least for the hovering flight phase.

20. The aircraft of claim 12, wherein the control unit is configured, in an event of a failure of the internal combustion engine detected at least in the forward flight phase, after a gliding phase with an aid of the left wing section and the right wing section and a subsequent low-level maneuver with continuous increase in the aerodynamic angle of attack while simultaneously reducing a horizontal speed, to control the thrust units to generate thrust immediately before the aircraft touches down on a ground.

21. The aircraft of claim 20, wherein the control unit is configured, during the gliding phase, to control the thrust nacelles to pivot into an autorotation position in order, by reversing a direction of torque on the left thrust nacelle and the right thrust nacelle and torque guided via the shaft to an electrical generator of the internal combustion engine, to supply electrical energy generated by the electrical generator to the battery system.

* * * * *